United States Patent
Tatekawa et al.

(10) Patent No.: US 6,245,702 B1
(45) Date of Patent: Jun. 12, 2001

(54) HIGH-FREQUENCY DIELECTRIC CERAMIC COMPOSITION, DIELECTRIC RESONATOR, DIELECTRIC FILTER, DIELECTRIC DUPLEXER AND COMMUNICATION DEVICE

(75) Inventors: Tsutomu Tatekawa, Otsu; Hitoshi Takagi, Omihachiman; Hiroshi Tamura, Otsu, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/472,398

(22) Filed: Dec. 27, 1999

(30) Foreign Application Priority Data

Dec. 24, 1998 (JP) ................................. 10-366384
Jun. 22, 1999 (JP) ................................. 11-175715
Jun. 22, 1999 (JP) ................................. 11-175716

(51) Int. Cl.⁷ ........................... C04B 35/462; H01P 7/10
(52) U.S. Cl. ........................... 501/136; 333/219.1
(58) Field of Search .................... 333/126, 135, 333/219.1

(56) References Cited

U.S. PATENT DOCUMENTS

| | | | | |
|---|---|---|---|---|
| 4,142,164 | * | 2/1979 | Nishikawa et al. | 333/73 |
| 5,470,808 | * | 11/1995 | Okuyama et al. | 501/136 |
| 5,781,080 | * | 7/1998 | Ando | 333/126 |
| 5,824,616 | * | 10/1998 | Kagato et al. | 501/136 |
| 5,846,892 | * | 12/1998 | Takada | 501/136 |

FOREIGN PATENT DOCUMENTS 63-124602    5/1988    (JP).
4287403     10/1992    (JP).

OTHER PUBLICATIONS

Chemical Abstracts; vol. 120, No. 14; Apr. 4, 1994; Columbus, Ohio, US; Abstract No. 18102, Kuramitsu, Hidenori: "Dielectric Ceramic Compositions"; XP002144699; Abstract & JP 05 266711 A (Matsushita Electric Ind. Co., Ltd., Japan); Oct. 15, 1993.

Patent Abstracts of Japan; vol. 1999; No. 07; Mar. 31, 1999; & JP 08 017246 A (Korea Advanced List Inst. of Sci. Technol.); Jan. 19, 1996; Abstract.

* cited by examiner

*Primary Examiner*—Karl Group
(74) *Attorney, Agent, or Firm*—Ostrolenk, Faber, Gerb & Soffen, LLP (57) ABSTRACT

The present invention provides a high-frequency dielectric ceramic composition having both high dielectric constant ($\epsilon_r$) and high Q value, and excellent temperature stability of the resonance frequency. The high-frequency dielectric ceramic composition contains a rare earth element (Ln), Mg, Ta, Ti and M (M is at least one of Ca and Sr) and has a composition represented by the composition formula $aLnO_{x/2}$-$bMgO$-$cTaO_{5/2}$-$dMO$-$eTiO_2$, wherein a, b, c, d, e and x are mol % in the ranges of $0.100 \leq a \leq 0.350$, $0.067 \leq b \leq 0.233$, $0.033 \leq c \leq 0.117$, $0.150 \leq d \leq 0.400$, $0.150 \leq e \leq 0.400$, $a+b+c+d+e=1$, and $3 \leq x \leq 4$, respectively.

21 Claims, 4 Drawing Sheets

HIGH-FREQUENCY DIELECTRIC CERAMIC COMPOSITION, DIELECTRIC RESONATOR, DIELECTRIC FILTER, DIELECTRIC DUPLEXER AND COMMUNICATION DEVICE

BACKGROUND OF THE INVENTION

1. Field of the Invention

The present invention relates to a high-frequency dielectric ceramic composition and electronic devices using the same.

2. Description of the Related Art

Dielectric ceramics are widely used as materials for a dielectric resonator, a dielectric filter, a circuit board, etc., which are mounted on electronic apparatuses used in a high-frequency region such as a microwave or millimeter wave region, or the like, such as a cellular telephone, personal communication equipment, satellite broadcasting receiver, etc.

Dielectric characteristics required for such high-frequency dielectric ceramics include (1) a high dielectric constant ($\in_r$) for complying with the need for miniaturization because the wavelength of electromagnetic waves is shortened to $1/(\in_r)^{1/2}$ in the dielectric material, (2) a low dielectric loss, i.e., a high Q value, (3) excellent temperature stability of resonance frequency, i.e., the temperature coefficient ($\tau f$) of the resonance frequency of about 0 ppm/° C., etc.

Examples of conventional known dielectric ceramic compositions include dielectric ceramic compositions such as Ba(Zn, Ta)O$_3$ system compositions (Japanese Patent Publication No. Sho-58-25068), Ba(Sn, Mg, Ta)O$_3$ system compositions (Japanese Patent Publication No. Hei-3-34164), (Zr, Sn)TiO$_4$ system compositions (Japanese Patent Publication No. Hei-4-59267), Ba$_2$Ti$_9$O$_{20}$ (Japanese Laid-open Patent Application No. Sho-61-10806).

However, Ba(Zn, Ta)O$_3$ based and Ba(Sn, Mg, Ta)O$_3$ based materials have a high Q value of 150,000 to 300,000 (at 1 GHz) but have a relatively low dielectric constant ($\in_r$) of 24 to 30.

On the other hand, (Zr, Sn)TiO$_4$ based materials and Ba$_2$TiO$_{20}$ have a relatively high dielectric constant ($\in_r$) of 37 to 40, and a high Q value of 50,000 to 60,000 (at 1 GHz), but it is difficult to realize a relatively high dielectric constant ($\in_r$) of over 40.

There has recently been increasing demand for decreasing the loss and miniaturizing electronic apparatus, and accordingly, there has been increasing demand for developing dielectric materials having excellent dielectric characteristics, particularly, both a high dielectric constant ($\in_r$) and a high Q value. However, at present, it is impossible to satisfactorily comply with these demands.

SUMMARY OF THE INVENTION

Accordingly, it is one object of the present invention to provide a high-frequency dielectric ceramic composition having a relatively high dielectric constant ($\in_r$) of, for example, 25 to 60, and a high Q value of, for example, 15,000 (at 1 GHz), and permitting arbitrary control of the temperature coefficient of the resonance frequency to about 0 ppm/° C., and a dielectric resonator comprising the dielectric ceramic composition.

In order to solve the above-described technical problems, a high-frequency dielectric ceramic composition of the present invention comprises a rare earth element (Ln), Mg, Ta, Ti and M (M: at least one of Ca and Sr), and has a composition represented by the composition formula aLnO$_{x/2}$-bMgO-cTaO$_{5/2}$-dMO-eTiO$_2$, wherein a, b, c, d, e and x are mol % and are in the ranges of $0.100 \leq a \leq 0.350$, $0.067 \leq b \leq 0.233$, $0.033 \leq c \leq 0.117$, $0.150 \leq d \leq 0.400$, $0.150 \leq e \leq 0.400$, a+b+c+d+e=1, and $3 \leq x \leq 4$, respectively.

The a, b, c, d, e and x are preferably in the ranges of $0.150 \leq a \leq 0.200$, $0.100 \leq b \leq 0.133$, $0.050 \leq c \leq 0.067$, $0.300 \leq d \leq 0.350$, $0.300 \leq e \leq 0.350$, a+b+c+d+e=1, and 3×4, respectively.

Another high-frequency dielectric ceramic composition of the present invention comprises a rare earth element (Ln), Mg, Ta, Ti and M (M: at least one of Ca and Sr), and has a composition represented by the composition formula yLn(Mg$_{2/3}$Ta$_{1/3}$)O$_3$-(1-y)MTiO$_3$, wherein y is in the range of $0.2 \leq y \leq 0.7$.

The rare earth element (Ln) is preferably at least one of Y, La, Ce, Pr, Nd, Sm, Dy and Er, and is more preferably La.

Figure 3:
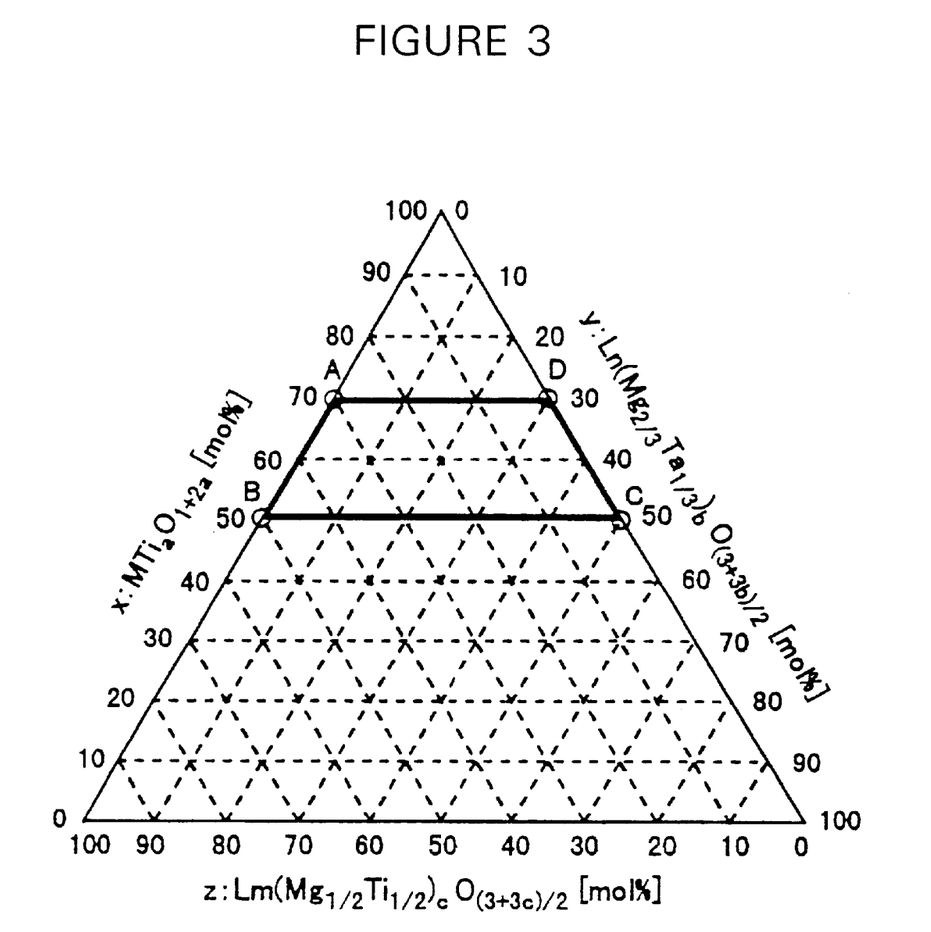
FIG. 3 is a ternary composition diagram of $MTiO_3$-Ln $(Mg_{2/3}Ta_{1/3})O_3$-Lm$(Mg_{1/2}Ti_{1/2})O_3$ system compositions.

Still another preferred high-frequency dielectric ceramic composition comprises a rare earth element (Ln and Lm), Mg, Ta, Ti and M (M: at least one of Ca and Sr), and has a composition represented by the composition formula xMTi$_a$O$_{1+2a}$-yLn(Mg$_{2/3}$Ta$_{1/3}$)$_b$O$_{(3+3b)/2}$-zLm(Mg$_{1/2}$Ti$_{1/2}$)$_c$O$_{(3+3c)/2}$ (wherein x, y and z are by mol %); wherein a, b, and c are in the ranges of $0.950 \leq a \leq 1.050$, $0.900 \leq b \leq 1.050$, and $0.900 \leq c \leq 1.050$; x, y and z are on a polygonal line or inside the line (except on lines A'B' and C'D') which connects point A' (x=70, y=0, z=30), point B' (x=50, y=0, z=50), point C' (x=50, y=50, z=0) and point D' (x=70, y=30 z,=0) in the ternary composition diagram of FIG. 3.

The rare earth element (Ln, Lm) is preferably at least one of Y, La, Pr, Nd, and Sm. The element M is preferably Ca. The rare earth element (Ln, Lm) is more preferably at least one of La, Nd and Sm. The rare earth element (Ln, Lm) is most preferably La.

Figure 4:
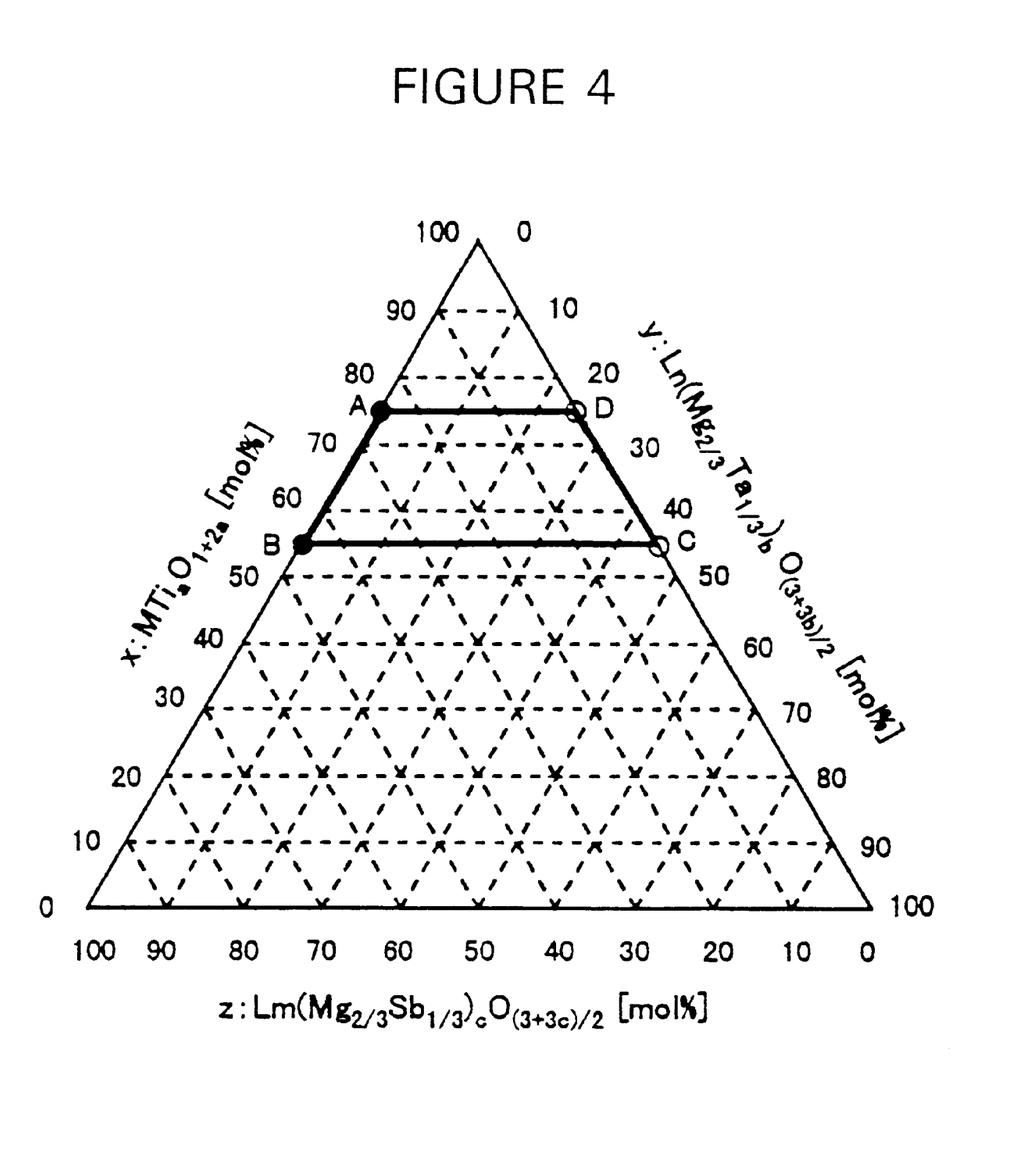
FIG. 4 is a ternary composition diagram of $MTiO_3$-Ln $(Mg_{2/3}Ta_{1/3})O_3$-Lm$(Mg_{2/3}Sb_{1/3})O_3$ system compositions.

A further preferred high-frequency dielectric ceramic composition comprises a rare earth element (Ln or Lm), Mg, Ta, Sb, Ti and M (M: at least one of Ca and Sr), and has a composition represented by the composition formula by molar ratio, xMTi$_a$O$_{1+2a}$-yLn(Mg$_{2/3}$Ta$_{1/3}$)$_b$O$_{(3+3b)/2}$-zLm(Mg$_{2/3}$Sb$_{1/3}$)$_c$O$_{(3+3c)/2}$ (wherein x, y and z are by mol %); wherein a, b, and c are in the ranges of $0.950 \leq a \leq 1.050$, $0.900 \leq b \leq 1.050$, and $0.900 \leq c \leq 1.050$, respectively; x, y and z are on a polygonal line or inside the line (except on line C"D"), which connects point A" (x=75, y=0, z=25), point B" (x=55, y=0, z=45), point C" (x=55, y=45, z=0) and point D" (x=75, y=25 z=0), in a ternary composition diagram of FIG. 4.

The rare earth element (Ln, Lm) is at least one of Y, La, Pr, Nd and Sm. The element M is preferably Ca. The rare earth element (Ln, Lm) is preferably at least one of La, Nd and Sm. The rare earth element (Ln, Lm) is most preferably La.

A dielectric resonator of the present invention is operated by electromagnetic field coupling of the dielectric ceramic with input/output terminals, wherein the dielectric ceramic is composed of any one of the above-described high-frequency dielectric ceramic compositions.

A dielectric filter of the present invention comprises the above dielectric resonator including external couplings.

A dielectric duplexer of the present invention comprises at least two dielectric filters, input/output connections to each of the dielectric filters, and an antenna connector connected to the dielectric filters in common, wherein at least one of the dielectric filters is the above-described dielectric filter.

A communication device of the present invention comprises the above dielectric duplexer, a transmitting circuit connected to at least one input/output connection of the dielectric duplexer, a receiving circuit connected to at least one input/output connection different from the input/output connection connected to the transmitting circuit, and an antenna connected to the dielectric duplexer.

DESCRIPTION OF THE PREFERRED EMBODIMENT

Figure 1:
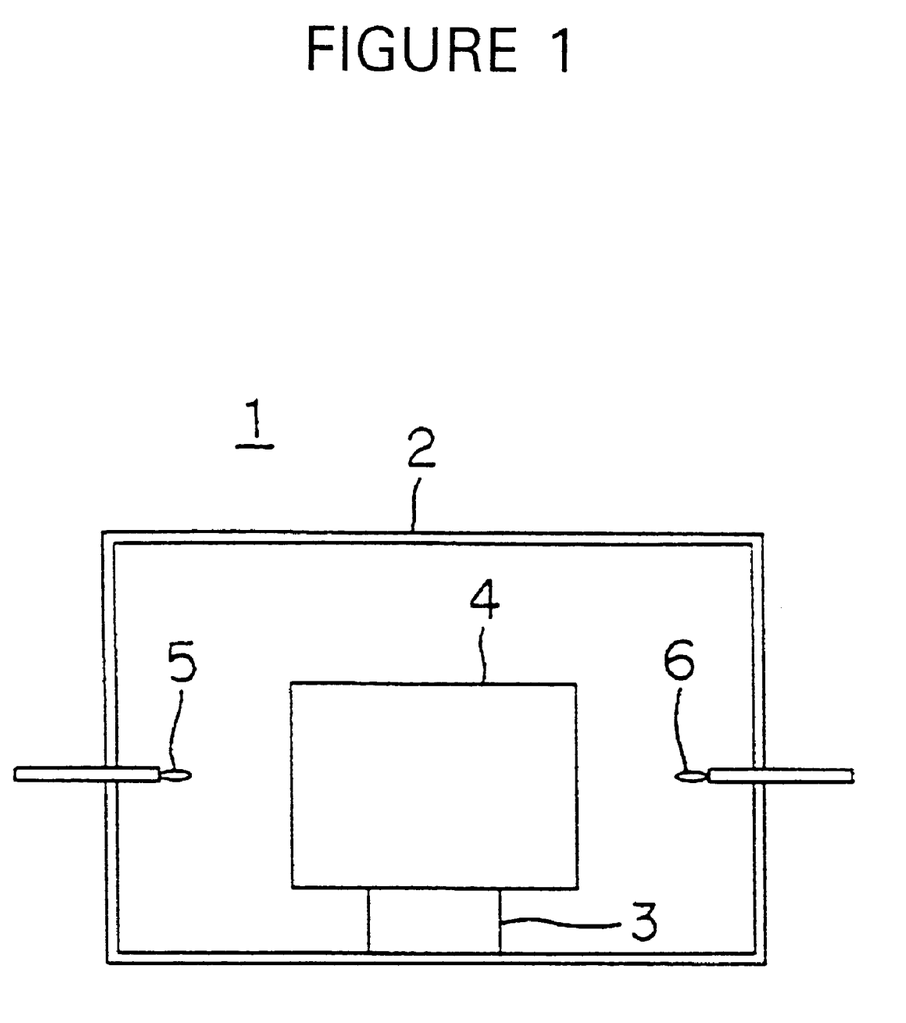
FIG. 1 is a sectional view of a dielectric resonator of the present invention.

FIG. 1 is a sectional view showing the fundamental structure of a dielectric resonator 1 comprising a ceramic composition of the present invention.

The dielectric resonator 1 comprising a metallic case 2 and a columnar dielectric ceramic 4 arranged in the space of the metallic case to be supported by a support 3. Input and output terminals 5 and 6 are held by the metallic case 2 in a state insulated from the metallic case 2.

The dielectric ceramic 4 is operated by electromagnetic field coupling with the input and output terminals 5 and 6 so that only signals at a predetermined frequency input from the input terminal 5 are output from the output terminal 6.

The dielectric ceramic 4 provided in the dielectric resonator 1 is composed of a high-frequency dielectric ceramic composition of the present invention.

Figure 2:
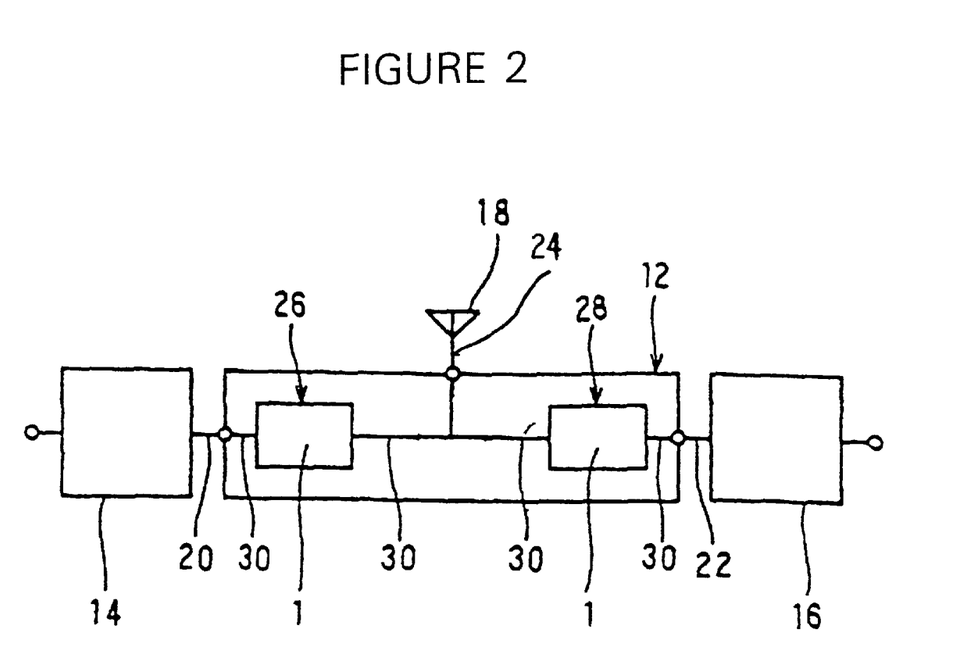
FIG. 2 is a block diagram of a communication device of the present invention.

FIG. 2 is a block diagram showing an example of a communication device of the present invention. The communication device 10 comprises a dielectric duplexer 12, a transmitting circuit 14, a receiving circuit 16 and an antenna 18. The transmitting circuit 14 is connected to an input connector 20 of the dielectric duplexer 12; the receiving circuit 16 is connected to an output connector 22 of the dielectric duplexer 12. The antenna 18 is connected to antenna connector 24 of the dielectric duplexer 12. The dielectric duplexer 12 comprises two dielectric filters 26 and 28. Each of the dielectric filters 26 and 28 is formed by connecting external couplings to the dielectric resonator of the present invention. In this embodiment, for example, external coupling 30 is connected to each of the input/output terminals of the dielectric resonator 1. One of the dielectric filters 26 and 28 is connected between the input connector 20 and the other dielectric filter 28; the other dielectric filter 28 is connected between the other of the dielectric filters 26 and 28 and the output connector 22.

As described above, the high-frequency dielectric ceramic composition of the present invention comprises a rare earth element (Ln), Mg, Ta, Ti, and M (M: at least one of Ca and Sr), and has a composition represented by the composition formula $aLnO_{x/2}$-$bMgO$-$cTaO_{5/2}$-$dMO$-$eTiO_2$ wherein $a+b+c+d+e=1$, x is in the range of $3 \leq x \leq 4$, and a, b, c, d and e are respectively selected in the following ranges:

First, a is selected in the range of $0.100 \leq a \leq 0.350$. This is because with a<0.100, the Q value is decreased, while with 0.350<a, the absolute value of the temperature coefficient (τf) of the resonance frequency exceeds 80 ppm/° C.

The parameter a is more preferably selected in the range of $0.150 \leq a \leq 0.200$ because it is possible to obtain the characteristic that the temperature coefficient (τf) of the resonance frequency is 28 ppm/° C. or less.

The parameters b and c are selected in the ranges of $0.067 \leq b \leq 0.233$ and $0.033 \leq c \leq 0.117$, respectively. This is because with b<0.067 or c<0.033, the Q value is decreased, while with 0.233<b or 0.117<c, the absolute value of the temperature coefficient (τf) of the resonance frequency exceeds 80 ppm/° C.

More preferably, b is in the range of $0.100 \leq b \leq 0.133$, and c is in the range of $0.050 \leq c \leq 0.067$ because it is possible to obtain the characteristic that the temperature coefficient (τf) of the resonance frequency is 28 ppm/° C. or less.

The parameter d is selected in the range of $0.150 \leq d \leq 0.400$. This is because with d>0.400, the Q value is decreased, while with d<0.150, the absolute value of the temperature coefficient (τf) of the resonance frequency exceeds 80 ppm/° C.

More preferably, d is in the range of $0.300 \leq d \leq 0.350$ because it is possible to obtain the characteristic that the temperature coefficient (τf) of the resonance frequency is 28 ppm/° C. or less.

The parameter e is in the range of $0.150 \leq e \leq 0.400$. This is because with 0.400<e, the Q value is decreased, while with e<0.150, the absolute value of the temperature coefficient (τf) of the resonance frequency exceeds 80 ppm/° C.

The parameter e is more preferably selected in the range of $0.300 \leq e \leq 0.350$ because it is possible to obtain the characteristic that the temperature coefficient (τf) of the resonance frequency is 28 ppm/° C. or less.

In the high-frequency dielectric ceramic composition of the present invention, as the rare earth element (Ln), at least one of Y, La, Ce, Pr, Nd, Sm, Dy and Er can be used. Of these elements, La is more preferably used. This is because the use of La can increase the dielectric constant ($\in_r$) and Q value compared with the other elements.

In the high-frequency dielectric ceramic composition of the present invention, small amounts of additives may be added in ranges having no adverse effect on the object of the present invention. For example, addition of about 0.01 to 0.1% by weight of $SiO_2$, ZnO, MnO, $B_2O_3$, NiO, CuO, $Li_2CO_3$, or the like, decreases the firing temperature by 20 to 30° C., and deterioration of electrical characteristics is relatively small. Also addition of about 1 to 3% by weight of $Al_2O_3$, $Sb_2O_3$, $V_2O_5$, $WO_3$, or the like, permits fine control of the dielectric constant and temperature characteristic, thereby obtaining excellent dielectric ceramic.

The high-frequency dielectric ceramic composition of the present invention is preferably represented by the composition formula $yLn(Mg_{2/3}Ta_{1/3})O_3$-$(1-y)MTiO_3$, which is more specific than the above composition formula, and y can be changed in the range of $0.2 \leq y \leq 0.7$ to change the temperature coefficient (τf) of the resonance frequency to any desired values with 0 ppm/° C. as the center. In this case, the dielectric constant ($\in_r$) is as high as 25 to 60, and the Q value is 15,000 or more.

The present invention will be described below based on examples.

As starting raw materials, high-purity rare earth oxides ($La_2O_3$, and the like), magnesium oxide (MgO), tantalum oxide ($Ta_2O_3$), calcium carbonate ($CaCO_3$), strontium carbonate ($SrCO_3$), and titanium oxide ($TiO_2$) were prepared, and these materials were mixed at the composition ratios shown in Tables 1 and 2.

TABLE 1

| Sample No. | y | LaO₃/₂ a | MgO b | TaO₅/₂ c | CaO (M) d | SrO (M) | TiO₂ e | Dielectric Constant εr | Q Value 1 GHz | Temperature Coefficient of Resonance Frequency τf(ppm/°C.) |
|---|---|---|---|---|---|---|---|---|---|---|
| *1 | 0.150 | 0.075 | 0.050 | 0.025 | 0.425 | 0.000 | 0.425 | 66.0 | 14700 | 72 |
| *2 | — | 0.095 | 0.070 | 0.035 | 0.400 | 0.000 | 0.400 | 57.3 | 18000 | 55 |
| *3 | — | 0.100 | 0.060 | 0.040 | 0.400 | 0.000 | 0.400 | 45.0 | 7800 | 55 |
| *4 | — | 0.100 | 0.067 | 0.033 | 0.390 | 0.000 | 0.410 | 62.4 | 19200 | 60 |
| 5 | 0.200 | 0.100 | 0.067 | 0.033 | 0.400 | 0.000 | 0.400 | 59.9 | 20600 | 49 |
| *6 | — | 0.100 | 0.067 | 0.033 | 0.410 | 0.000 | 0.390 | 58.5 | 18300 | 51 |
| *7 | — | 0.100 | 0.072 | 0.028 | 0.400 | 0.000 | 0.400 | 42.0 | 6100 | 59 |
| *8 | — | 0.105 | 0.063 | 0.032 | 0.400 | 0.000 | 0.400 | 60.0 | 19500 | 52 |
| 9 | 0.250 | 0.125 | 0.083 | 0.042 | 0.375 | 0.000 | 0.375 | 54.3 | 30300 | 29 |
| 10 | 0.300 | 0.150 | 0.100 | 0.050 | 0.350 | 0.000 | 0.350 | 49.4 | 35400 | 20 |
| 11 | 0.330 | 0.165 | 0.110 | 0.055 | 0.335 | 0.000 | 0.335 | 47.0 | 36400 | 8 |
| 12 | 0.340 | 0.170 | 0.113 | 0.057 | 0.330 | 0.000 | 0.330 | 45.2 | 37000 | 2 |
| 13 | — | 0.174 | 0.116 | 0.060 | 0.325 | 0.000 | 0.325 | 44.5 | 35200 | −6 |
| 14 | — | 0.174 | 0.118 | 0.058 | 0.325 | 0.000 | 0.325 | 44.8 | 37100 | −6 |
| 15 | — | 0.174 | 0.117 | 0.059 | 0.325 | 0.000 | 0.325 | 44.5 | 35500 | −7 |
| 16 | — | 0.175 | 0.117 | 0.058 | 0.320 | 0.000 | 0.330 | 45.3 | 36900 | −4 |
| 17 | 0.350 | 0.175 | 0.117 | 0.058 | 0.325 | 0.000 | 0.325 | 44.4 | 36300 | −8 |
| 18 | — | 0.175 | 0.117 | 0.058 | 0.330 | 0.000 | 0.320 | 44.3 | 34600 | −7 |
| 19 | — | 0.176 | 0.116 | 0.058 | 0.325 | 0.000 | 0.325 | 44.2 | 35200 | −7 |
| 20 | — | 0.176 | 0.115 | 0.059 | 0.325 | 0.000 | 0.325 | 44.3 | 35800 | −6 |
| 21 | — | 0.176 | 0.117 | 0.057 | 0.325 | 0.000 | 0.325 | 44.8 | 36900 | −6 |
| 22 | — | 0.184 | 0.111 | 0.055 | 0.325 | 0.000 | 0.325 | 43.1 | 19800 | −7 |
| 23 | 0.400 | 0.200 | 0.133 | 0.067 | 0.300 | 0.000 | 0.300 | 40.5 | 21200 | −28 |
| 24 | 0.450 | 0.225 | .0150 | 0.075 | 0.275 | 0.000 | 0.275 | 37.2 | 41200 | −40 |
| 25 | 0.500 | 0.250 | 0.167 | 0.083 | 0.250 | 0.000 | 0.250 | 34.8 | 45700 | −52 |
| 26 | 0.550 | 0.275 | 0.183 | 0.092 | 0.225 | 0.000 | 0.225 | 32.7 | 46600 | −60 |
| 27 | 0.600 | 0.300 | 0.200 | 0.100 | 0.200 | 0.000 | 0.200 | 30.5 | 53000 | −64 |
| 28 | 0.650 | 0.325 | 0.217 | 0.108 | 0.175 | 0.000 | 0.175 | 28.5 | 50100 | −72 |
| *29 | — | 0.333 | 0.245 | 0.122 | 0.150 | 0.000 | 0.150 | 26.4 | 56500 | −85 |
| *30 | — | 0.350 | 0.211 | 0.139 | 0.150 | 0.000 | 0.150 | 24.0 | 16100 | −82 |
| *31 | — | 0.350 | 0.233 | 0.117 | 0.145 | 0.000 | 0.155 | 28.7 | 61100 | −81 |
| 32 | 0.700 | 0.350 | 0.233 | 0.117 | 0.150 | 0.000 | 0.150 | 27.0 | 65200 | −79 |
| *33 | — | 0.350 | 0.233 | 0.117 | 0.155 | 0.000 | 0.145 | 26.5 | 50600 | −83 |
| *34 | — | 0.350 | 0.251 | 0.099 | 0.150 | 0.000 | 0.150 | 23.5 | 10800 | −82 |
| *35 | — | 0.368 | 0.221 | 0.111 | 0.150 | 0.000 | 0.150 | 27.2 | 55300 | −82 |
| *36 | 0.750 | 0.375 | 0.250 | 0.125 | 0.125 | 0.000 | 0.125 | 26.1 | 58200 | −81 |
| *37 | 0.800 | 0.400 | 0.267 | 0.133 | 0.100 | 0.000 | 0.100 | 25.8 | 57100 | −84 |
| 38 | 0.400 | 0.200 | 0.133 | 0.067 | 0.000 | 0.300 | 0.300 | 44.5 | 10300 | 18 |
| 39 | 0.450 | 0.225 | 0.150 | 0.075 | 0.000 | 0.275 | 0.275 | 40.5 | 15600 | −32 |
| 40 | 0.500 | 0.250 | 0.167 | 0.083 | 0.000 | 0.250 | 0.250 | 36.7 | 24300 | −42 |
| 41 | 0.550 | 0.275 | 0.183 | 0.092 | 0.000 | 0.225 | 0.225 | 34.6 | 32800 | −48 |
| 42 | 0.600 | 0.300 | 0.200 | 0.100 | 0.000 | 0.200 | 0.200 | 31.8 | 38700 | −60 |
| 43 | 0.650 | 0.325 | 0.217 | 0.108 | 0.000 | 0.175 | 0.175 | 30.0 | 15800 | −73 |
| 44 | 0.700 | 0.350 | 0.233 | 0.117 | 0.000 | 0.150 | 0.150 | 27.9 | 15100 | −78 |
| *45 | 0.750 | 0.375 | 0.250 | 0.125 | 0.000 | 0.125 | 0.125 | 26.1 | 13000 | −81 |
| *46 | 0.800 | 0.400 | 0.267 | 0.133 | 0.000 | 0.100 | 0.100 | 26.0 | 12200 | −88 |
| 47 | 0.350 | 0.175 | 0.117 | 0.058 | 0.293 | 0.032 | 0.325 | 45.2 | 31200 | −1 |
| 48 | 0.350 | 0.175 | 0.117 | 0.058 | 0.228 | 0.097 | 0.325 | 46.8 | 25500 | 8 |
| 49 | 0.350 | 0.175 | 0.117 | 0.058 | 0.163 | 0.162 | 0.325 | 47.1 | 18200 | 14 |
| 50 | 0.400 | 0.200 | 0.133 | 0.067 | 0.270 | 0.030 | 0.300 | 42.0 | 22500 | −12 |
| 51 | 0.400 | 0.200 | 0.133 | 0.067 | 0.210 | 0.090 | 0.300 | 44.4 | 18900 | 4 |
| 52 | 0.400 | 0.200 | 0.133 | 0.067 | 0.150 | 0.150 | 0.300 | 46.5 | 15400 | 13 |

TABLE 2

| Sample No. | Rare Earth Element (Ln) | Dielectric Constant εr | Q Value 1 GHz | Temperature Coefficient of Resonance Frequency τf(ppm/°C.) | Remarks |
|---|---|---|---|---|---|
| 53 | Y | 36.6 | 15100 | −4 | Composition corresponding to Sample 17 shown in Table 1 |
| 54 | 0.1 Y · 0.9 La | 43.0 | 29800 | −8 | |
| 55 | 0.3 Y · 0.7 La | 40.5 | 25300 | −6 | |
| 56 | 0.5 Y · 0.5 La | 38.1 | 22400 | −5 | |
| 57 | 0.5 Ce · 0.5 La | 42.0 | 18000 | −5 | |
| 58 | Nd | 42.5 | 16200 | −7 | |
| 59 | 0.1 Nd · 0.9 La | 44.1 | 29000 | −8 | |
| 60 | 0.3 Nd · 0.7 La | 43.8 | 24300 | −7 | |
| 61 | 0.5 Nd · 0.5 La | 43.3 | 19500 | −7 | |
| 62 | 0.5 Pr · 0.5 La | 42.5 | 17900 | −6 | |
| 63 | Sm | 37.2 | 32600 | −3 | |
| 64 | 0.1 Sm · 0.9 La | 43.9 | 34200 | −9 | |

TABLE 2-continued

| Sample No. | Rare Earth Element (Ln) | Dielectric Constant $\epsilon_r$ | Q Value 1 GHz | Temperature Coefficient of Resonance Frequency $\tau f(ppm/°C.)$ | Remarks |
|---|---|---|---|---|---|
| 65 | 0.3 Sm · 0.7 La | 42.3 | 34000 | −8 | |
| 66 | 0.5 Sm · 0.5 La | 40.4 | 34100 | −5 | |
| 67 | 0.5 Dy · 0.5 La | 41.2 | 29500 | −4 | |
| 68 | 0.5 Er · 0.5 La | 39.8 | 28400 | −6 | |
| 69 | Y | 37.0 | 15100 | 10 | Composition corresponding to Sample 48 shown in Table 1 |
| 70 | 0.5 Y · 0.5 La | 39.7 | 18600 | 8 | |
| 71 | Nd | 44.3 | 15800 | 7 | |
| 72 | 0.5 Nd · 0.5 La | 45.2 | 20200 | 8 | |
| 73 | Sm | 39.5 | 23700 | 10 | |
| 74 | 0.5 Sm · 0.5 La | 44.0 | 25000 | 9 | |

In Table 1, y represents the ratio of $Ln(Mg_{2/3}Ta_{1/3})O_3$ to $MTiO_3$ in the composition formula: $yLn(Mg_{2/3}Ta_{1/3})O_3\text{-}(1-y)MTiO_3$.

In Table 1, a, b, c, d and e respectively represent the molar amounts of the components in the composition $aLnO_{x/2}\text{-}bMgO\text{-}cTaO_{5/2}\text{-}dMO\text{-}eTiO_2$ (wherein M is Ca and/or Sr).

Samples 53 to 74 shown in Table 2 respectively contain the various rare earth element oxides shown in the column "Rare earth element" in place of $La_2O_3$ shown in Table 1, Samples 53 to 68 respectively have compositions corresponding to Sample 17 shown in Table 1, and Samples 69 to 74 respectively have compositions corresponding to Sample 48 shown in Table 1.

In Table 1, Samples Nos. marked with an asterisk * are beyond the range of the present invention.

A powder prepared at each of the composition ratios shown in Tables 1 and 2 was wet-milled for 16 hours by using a ball mill, dehydrated, dried and then calcined at 1100 to 1300° C. for 3 hours. An appropriate amount of binder was added to the resultant calcined powder and the mixture was again ground for 16 hours by using the ball mill to obtain a powder.

The thus-obtained powder was molded to a disk shape by using a press under a pressure of 1,000 to 2,000 kg/cm², and then fired in the atmosphere at 1,400 to 1,500° C. for 4 to 10 hours to obtain a sintered compact having a diameter of 10 mm and a thickness of 5 mm.

The thus-obtained sintered compact was measured with respect to the dielectric constant ($\epsilon_r$) at a measurement frequency of 6 to 8 GHz, and the Q value by a double-end short-circuit type dielectric resonator method, and the measurements were converted to a Q value at 1 GHz according to Q×f=constant. Also the temperature coefficient (τf) of the resonance frequency between 25° C. and 55° C. was measured from the $TE_{01\delta}$ mode resonance frequency. The results are shown in Tables 1 and 2.

Tables 1 and 2 indicate that the samples in the range of the present invention can exhibit high Q values while maintaining dielectric constants at high values in the microwave band.

The reasons for respectively limiting the molar ratios a, b, c, d, and e in the ranges of the present invention will be described mainly with reference to Table 1.

First, the reason for limiting a in the range of $0.100 \leq a \leq 0.350$ is that with a<0.100, as in Samples 1 and 2, the Q value is decreased, while with a>0.350, as in Samples 35, 36, 37, 45 and 46, the absolute value of the temperature coefficient (τf) of the resonance frequency exceeds 80 ppm/° C.

The reason why the range of $0.150 \leq a \leq 0.200$ is preferable is that as in Samples 10 to 23 and 47 to 52, the absolute value of the temperature coefficient (τf) of the resonance frequency is 28 ppm/° C. or less.

The reason for limiting b in the range of $0.067 \leq b \leq 0.233$ is that with b<0.067, as in Samples 1, 3 and 8, the Q value is decreased, while with b>0.233, as in Samples 29, 34, 36, 37, 45, and 46, the absolute value of the temperature coefficient (τf) of the resonance frequency exceeds 80 ppm/° C.

The reason why the range of $0.100 \leq b \leq 0.133$ is preferable is that as in Samples 10 to 23, 38, and 47 to 52, the absolute value of the temperature coefficient (τf) of the resonance frequency is 28 ppm/° C. or less.

The reason for limiting c in the range of $0.033 \leq c \leq 0.117$ is that with c<0.033, as in Samples 1, 7, and 8, the Q value is decreased, while with c>0.117, as in Samples 29, 30, 36, 37, 46 and 46, the absolute value of the temperature coefficient (τf) of the resonance frequency exceeds 80 ppm/° C.

The reason why the range of $0.050 \leq c \leq 0.067$ is preferable is that as in Samples 10 to 23, 38, and 47 to 52, the absolute value of the temperature coefficient (τf) of the resonance frequency is 28 ppm/° C. or less.

The reason for limiting d in the range of $0.150 \leq a \leq 0.400$ is that with d>0.400, as in Samples 1 and 6, the Q value is decreased, while with d<0.150, as in Samples 31, 36, 37, 45, and 46, the absolute value of the temperature coefficient (τf) of the resonance frequency exceeds 80 ppm/° C.

The reason why the range of $0.300 \leq d \leq 0.350$ is preferable is that as in Samples 10 to 23, 38, and 47 to 52, the absolute value of the temperature coefficient (τf) of the resonance frequency is 28 ppm/° C. or less.

The reason for limiting e in the range of $0.150 \leq a \leq 0.400$ is that with e>0.400, as in Samples 1 and 4, the Q value is decreased, while with e<0.150, as in Samples 33, 36, 37, 45, and 46, the absolute value of the temperature coefficient (τf) of the resonance frequency exceeds 80 ppm/° C.

The reason why the range of $0.300 \leq e \leq 0.350$ is preferable is that as in Samples 10 to 23, 38, and 47 to 52, the absolute value of the temperature coefficient (τf) of the resonance frequency is 28 ppm/° C. or less.

Comparison of Sample 17 shown in Table 1 with Samples 53 to 68 shown in Table 2 indicates that it is preferable to use La as the rare earth element. The use of La can further increase both the dielectric constant ($\epsilon_r$) and the Q value.

In Table 1, samples having "y" values described in the table have compositions represented by the composition formula: $yLn(Mg_{2/3}Ta_{1/3})O_3\text{-}(1-y)MTiO_3$ and the main crystal is composed of a perovskite crystal phase. However, comparison between Samples 5, 9 to 12, 17, 23 to 28, 32, 38 to 44, and 47 to 52 reveals that the temperature coefficient (τf) of the resonance frequency can be changed to any desired values with 0 ppm/° C. as a center by changing y in the range of $0.2 \leq y \leq 0.7$. These samples exhibit dielectric constants ($\epsilon_r$) of as high as about 25 to 60, and most of the samples exhibit Q values of 15,000 or more.

As described above, the present invention can provide a high-frequency dielectric ceramic composition having both a high dielectric constant and high Q value, and permitting a decrease in the temperature coefficient (τf) of the resonance frequency, and a dielectric ceramic obtained by sintering the composition can be advantageously used for high-frequency devices such as a dielectric resonator, etc.

The high-frequency dielectric ceramic composition of the present invention has a composition represented by the composition formula: yLn(Mg$_{2/3}$Ta$_{1/3}$)O$_3$-(1-y)MTiO$_3$ (wherein Ln is a rare earth element, and M is at least one of Ca and Sr), wherein y is in the range of $0.2 \leq y \leq 0.7$. The main crystal is composed of a perovskite crystal phase. In this case, y can be changed to control the temperature coefficient (τf) of the resonance frequency to any desired values with 0 ppm/° C. as a center.

Other Preferred Embodiments

A high-frequency dielectric ceramic composition comprises a rare earth element (Ln and Lm), Mg, Ta, Ti and M (M: at least one of Ca and Sr), and preferably has a composition represented by the composition formula: xMTi$_a$O$_{1+2a}$-yLn(Mg$_{2/3}$Ta$_{1/3}$)$_b$O$_{(3+3b)/2}$-zLm(Mg$_{1/2}$Ti$_{1/2}$)$_c$O$_{(3+3c)/2}$ (wherein x, y and z are by mol %), wherein a, b, c, x, y and z are respectively in the following ranges.

The parameter a is in the range of $0.850 \leq a \leq 1.050$. This is because with a<0.950, or a>1.050, the Q value is decreased, failing to achieve the object of the present invention.

The parameter b is in the range of $0.900 \leq a \leq 1.050$. This is because with b<0.900, or b>1.050, the Q value is decreased.

The parameter c is in the range of $0.900 \leq c \leq 1.050$. This is because with c<0.900, or c>1.050, the Q value is decreased.

The parameters x, y and z are on a polygonal line or inside the line (except on lines A'B' and C'D'), which connects points A', B', C' and D' in the ternary composition diagram of FIG. 3. With x, y and z outside the line A'D', the temperature coefficient (τf) of the resonance frequency exceeds +50 ppm/° C., while with x, y, and z outside the line B'C', the temperature coefficient (τf) of the resonance frequency is shifted to the minus side from −50 ppm/° C. The reason for excluding the line A'B' is that with y=0, the composition cannot be sufficiently sintered at a firing temperature of 1,350 to 1,450° C., and thus, firing at a high temperature of over 1,500° C. is required, thereby causing many disadvantages for industrial mass production.

The reason for excluding the range on the line C'D' is as follows. With x constant, the temperature coefficient (τf) of the resonance frequency is shifted to the minus side as z decreases. Therefore, in order to obtain the same temperature coefficient (τf) of the resonance frequency, it is necessary to increase x as z is decreased. However, the Q value is decreased by increasing x, and thus x is as low as possible for obtaining a high Q value. For this reason, the range on the line C'D' is excluded because the effect of decreasing x, i.e., the effect of improving the Q value, cannot be expected. Since tantalum oxide (Ta$_2$O$_5$) as a starting raw material is an expensive material, a composition containing tantalum oxide is undesirable from the viewpoint of industrial application.

In the high-frequency dielectric ceramic composition of the present invention, as the rare earth element (Ln and Lm), Y, La, Pr, Nd, Sm, or the like, is preferably used. However, of these elements, La, Nd or Sm is more preferably used, and La is most preferably used. The use of Nd or Sm improves the Q value, and the use of La can further increase the dielectric constant ($\in_r$) and the Q value.

The present invention will be further detailed below.

As starting raw materials, high-purity calcium carbonate (CaCO$_3$), strontium carbonate (SrCO$_3$), titanium oxide (TiO$_2$), rare earth oxides (La$_2$O$_3$, and the like), magnesium oxide (MgO) and tantalum oxide (Ta$_2$O$_5$) were prepared.

These raw materials were mixed to obtain compositions represented by the composition formula: xMTi$_a$O$_{1+2a}$-yLa(Mg$_{2/3}$Ta$_{1/3}$)$_b$O$_{(3+3b)/2}$-zLa(Mg$_{1/2}$Ti$_{1/2}$)$_c$O$_{(3+3c)/2}$ (wherein x, y and Z are by mol %) shown in Table 3. These raw materials were also mixed to obtain compositions represented by the composition formula: xMTi$_a$O$_{1+2a}$-yLn(Mg$_{2/3}$Ta$_{1/3}$)$_b$O$_{(3+3b)/2}$-zLm(Mg$_{1/2}$Ti$_{1/2}$)$_c$O$_{(3+3c)/2}$ (wherein x, y and z are by mol %) shown in Table 4.

TABLE 3

| | | xMTi$_a$O$_{1+2a}$ − yLa(Mg$_{2/3}$Ta$_{1/3}$)$_b$O$_{(3+3b)/2}$ − zLa(Mg$_½$Ti$_½$)$_c$O$_{(3+3c)/2}$ System | | | | | | Dielectric Constant | Q Value | Temperature Coefficient of Resonance Frequency |
|---|---|---|---|---|---|---|---|---|---|---|
| Sample No. | M | a | b | c | x | y | z | ϵr | 1 GHz | τf(ppm/° C.) |
| *1001 | Ca | 1.000 | 1.000 | 1.000 | 75.0 | 5.0 | 20.0 | 58.8 | 29300 | +57 |
| *1002 | Ca | 1.000 | 1.000 | 1.000 | 75.0 | 20.0 | 5.0 | 56.6 | 30500 | +51 |
| *1003 | Ca | 1.000 | 1.000 | 1.000 | 70.0 | 0.0 | 30.0 | | Poor Sintering | |
| 1004 | Ca | 1.000 | 1.000 | 1.000 | 70.0 | 10.0 | 20.0 | 51.1 | 34200 | +32 |
| 1005 | Ca | 1.000 | 1.000 | 1.000 | 70.0 | 20.0 | 10.0 | 50.2 | 34800 | +26 |
| *1006 | Ca | 1.000 | 1.000 | 1.000 | 70.0 | 30.0 | 0.0 | 49.4 | 35400 | +20 |
| 1007 | Ca | 1.000 | 1.000 | 1.000 | 65.0 | 10.0 | 25.0 | 47.0 | 36400 | +3 |
| 1008 | Ca | 1.000 | 1.000 | 1.000 | 65.0 | 25.0 | 10.0 | 44.8 | 38200 | −5 |
| *1009 | Ca | 1.000 | 1.000 | 1.000 | 60.0 | 0.0 | 40.0 | | Poor Sintering | |
| 1010 | Ca | 1.000 | 1.000 | 1.000 | 60.0 | 10.0 | 30.0 | 47.8 | 36300 | +8 |
| *1011 | Ca | 0.900 | 1.000 | 1.000 | 60.0 | 20.0 | 20.0 | 44.4 | 18600 | −4 |
| 1012 | Ca | 0.950 | 1.000 | 1.000 | 60.0 | 20.0 | 20.0 | 44.5 | 32500 | −3 |
| *1013 | Ca | 1.000 | 0.850 | 1.000 | 60.0 | 20.0 | 20.0 | 44.2 | 19700 | −3 |
| 1014 | Ca | 1.000 | 0.900 | 0.900 | 60.0 | 20.0 | 20.0 | 45.3 | 39000 | −4 |
| *1015 | Ca | 1.000 | 1.000 | 0.850 | 60.0 | 20.0 | 20.0 | 44.6 | 18900 | −4 |
| 1016 | Ca | 1.000 | 1.000 | 1.000 | 60.0 | 20.0 | 20.0 | 45.4 | 39500 | −4 |
| *1017 | Ca | 1.000 | 1.000 | 1.100 | 60.0 | 20.0 | 20.0 | 44.7 | 17600 | −3 |
| 1018 | Ca | 1.000 | 1.050 | 1.050 | 60.0 | 20.0 | 20.0 | 45.0 | 38500 | −4 |
| *1019 | Ca | 1.000 | 1.100 | 1.000 | 60.0 | 20.0 | 20.0 | 44.4 | 19000 | −3 |
| 1020 | Ca | 1.050 | 1.000 | 1.000 | 60.0 | 20.0 | 20.0 | 44.6 | 29100 | −3 |
| *1021 | Ca | 1.100 | 1.000 | 1.000 | 60.0 | 20.0 | 20.0 | 43.7 | 16100 | −2 |
| 1022 | Ca | 1.000 | 1.000 | 1.000 | 60.0 | 30.0 | 10.0 | 43.8 | 39600 | −10 |
| *1023 | Ca | 1.000 | 1.000 | 1.000 | 60.0 | 40.0 | 0.0 | 40.6 | 37600 | −28 |
| *1024 | Ca | 1.000 | 1.000 | 1.000 | 50.0 | 0.0 | 50.0 | | Poor Sintering | |
| 1025 | Ca | 1.000 | 1.000 | 1.000 | 50.0 | 15.0 | 35.0 | 42.0 | 38900 | −39 |
| 1026 | Ca | 1.000 | 1.000 | 1.000 | 50.0 | 35.0 | 15.0 | 36.9 | 42200 | −45 |
| *1027 | Ca | 1.000 | 1.000 | 1.000 | 50.0 | 50.0 | 0.0 | 34.8 | 45700 | −52 |

TABLE 3-continued

| | | xMTi$_a$O$_{1+2a}$ – yLa(Mg$_{2/3}$Ta$_{1/3}$)$_b$O$_{(3+3b)/2}$ – zLa(Mg$_{½}$Ti$_{½}$)$_c$O$_{(3+3c)/2}$ System | | | | | | Dielectric Constant | Q Value | Temperature Coefficient of Resonance Frequency |
|---|---|---|---|---|---|---|---|---|---|---|
| Sample No. | M | a | b | c | x | y | z | εr | 1 GHz | τf(ppm/° C.) |
| *1028 | Ca | 1.000 | 1.000 | 1.000 | 45.0 | 15.0 | 40.0 | 31.8 | 48300 | −63 |
| *1029 | Ca | 1.000 | 1.000 | 1.000 | 45.0 | 40.0 | 15.0 | 29.0 | 50100 | −74 |
| *1030 | 0.7Ca0.3Sr | 0.900 | 1.000 | 1.000 | 60.0 | 20.0 | 20.0 | 38.8 | 12300 | 1 |
| 1031 | 0.7Ca0.3Sr | 0.950 | 1.000 | 1.000 | 60.0 | 20.0 | 20.0 | 38.9 | 20600 | 2 |
| *1032 | 0.7Ca0.3Sr | 1.000 | 0.850 | 1.000 | 60.0 | 20.0 | 20.0 | 38.8 | 18400 | 2 |
| 1033 | 0.7Ca0.3Sr | 1.000 | 0.900 | 0.900 | 60.0 | 20.0 | 20.0 | 38.8 | 31500 | 1 |
| *1034 | 0.7Ca0.3Sr | 1.000 | 1.000 | 0.850 | 60.0 | 20.0 | 20.0 | 39.0 | 17600 | 1 |
| 1035 | 0.7Ca0.3Sr | 1.000 | 1.000 | 1.000 | 60.0 | 20.0 | 20.0 | 39.0 | 31000 | 2 |
| *1036 | 0.7Ca0.3Sr | 1.000 | 1.000 | 1.100 | 60.0 | 20.0 | 20.0 | 38.8 | 16300 | 2 |
| 1037 | 0.7Ca0.3Sr | 1.000 | 1.050 | 1.050 | 60.0 | 20.0 | 20.0 | 38.9 | 29200 | 2 |
| *1038 | 0.7Ca0.3Sr | 1.000 | 1.100 | 1.000 | 60.0 | 20.0 | 20.0 | 39.0 | 17600 | 1 |
| 1039 | 0.7Ca0.3Sr | 1.050 | 1.000 | 1.000 | 60.0 | 20.0 | 20.0 | 38.8 | 26300 | 2 |
| *1040 | 0.7Ca0.3Sr | 1.100 | 1.000 | 1.000 | 60.0 | 20.0 | 20.0 | 38.9 | 10100 | 1 |

TABLE 4 xMTi$_a$O$_{1+2a}$–yLa(Mg$_{2/3}$Ta$_{1/3}$)$_b$O$_{(3+3b)/2}$ –zLa(Mg$_{1/2}$Ti$_{1/2}$)$_c$O$_{(3+3c)/2}$ System

| Sample No. | Rare Earth Element (Ln, Lm) | Dielectric Constant εr | Q Value 1 GHz | Temperature Coefficient of Resonance Frequency τf(ppm/° C.) | Remarks |
|---|---|---|---|---|---|
| 1041 | Y | 42.9 | 36800 | −7 | Corresponding to Sample 1016 shown in Table 3 |
| 1042 | 0.1 Y · 0.9 La | 43.7 | 37800 | −6 | |
| 1043 | 0.3 Y · 0.7 La | 43.4 | 37200 | −6 | |
| 1044 | Pr | 43.8 | 37000 | −8 | |
| 1045 | 0.1 Pr · 0.9 La | 44.8 | 37600 | −7 | |
| 1046 | 0.3 Pr · 0.7 La | 44.0 | 37500 | −7 | |
| 1047 | Nd | 43.2 | 38800 | −8 | |
| 1048 | 0.1 Nd · 0.9 La | 44.2 | 39000 | −7 | |
| 1049 | 0.3 Nd · 0.7 La | 43.6 | 38700 | −6 | |
| 1050 | Sm | 42.0 | 39700 | −4 | |
| 1051 | 0.1 Sm · 0.9 La | 44.1 | 39100 | −5 | |
| 1052 | 0.3 Sm · 0.7 La | 43.2 | 39500 | −6 | |
| 1053 | 0.5 Y · 0.5 La | 38.8 | 30400 | 2 | Corresponding to sample 1035 shown in Table 3 |
| 1054 | 0.5 Pr · 0.5 La | 38.7 | 30600 | 3 | |
| 1055 | 0.5 Nd · 0.5 La | 38.5 | 31200 | 2 | |
| 1056 | 0.5 Sm · 0.5 La | 38.4 | 31300 | 4 | |

Samples 1041 to 1056 shown in Table 4 respectively contain the various rare earth elements shown in the column "Rare Earth Element" in Table 4 in place of La in the composition formula shown in Table 3, Samples 1041 to 1052 respectively have compositions corresponding to Sample 1016 shown in Table 3, and Samples 1053 to 1056 respectively have compositions corresponding to Sample 1035 shown in Table 3.

A powder of these mixed raw materials was wet-milled for 16 hours by using a ball mill, dehydrated, dried and then calcined at 1100 to 1300° C. for 3 hours. An appropriate amount of binder was added to the resultant calcined powder and the mixture was again wet-ground for 16 hours by using the ball mill to obtain a powder.

The thus-obtained powder was molded to a disk shape by using a press under a pressure of 1,000 to 2,000 kg/cm², and then fired in the atmosphere at 1350 to 14,500° C. for 4 hours to obtain ceramic having a diameter of 10 mm and a thickness of 5 mm. The main crystal exhibited a perovskite crystal phase.

The thus-obtained ceramic was measured with respect to the dielectric constant ($\epsilon_r$) at a measurement frequency of 6 to 8 GHz, and the Q value by a double-end short-circuit type dielectric resonator method, and the measurements were converted to a Q value at 1 GHz according to Q×f=constant. Also the temperature coefficient (τf) of the resonance frequency between 25° C. and 55° C. was measured from the TE$_{01δ}$ mode resonance frequency. The results are shown in Tables 3 and 4. In Table 3, Sample Nos. marked with an asterisk * are beyond the range of the present invention.

Tables 3 and 4 indicate that the samples in the range of the present invention can exhibit high Q values while maintaining dielectric constants at high values in the microwave band.

The reasons for limiting the composition represented by the composition formula of the present invention, xMTi$_a$O$_{1+2a}$–yLn(Mg$_{2/3}$Ta$_{1/3}$)$_b$O$_{(3+3b)/2}$–zLm(Mg$_{1/2}$Ti$_{1/2}$)$_c$O$_{(3+3c)/2}$ (wherein Ln and Lm are rare earth elements, and M is at least one of Ca and Sr), will be described mainly with reference to Table 3.

First, the reason for limiting a in the range of 0.950≦a≦1.050 is that with a<0.950, as in Samples 1011 and 1030, and with 1.050<a, as in Samples 1021 and 1040, the Q value is decreased, failing to achieve the object of the present invention.

The reason for limiting b in the range of 0.900≦a≦1.050 is that with b<0.900, as in Samples 1013 and 1032, and with b>1.050, as in Samples 1019 and 1038, the Q value is decreased.

The reason for limiting c in the range of 0.900≦a≦1.050 is that with c <0.900, as in Samples 1015 and 1034, and with c>1.050, as in Samples 1017 and 1036, the Q value is decreased.

The reasons for liming x, y and z in the region on the polygonal line or inside the line (except on the line A'B' and line C'D') which connects points A', B', C' and D' in the ternary composition diagram of FIG. 3 are as follows:

In the region outside the line A'D', as in Samples 1001 and 1002, the temperature coefficient (τf) of the resonance frequency exceeds +50 ppm/° C., while in the region outside the line B'C', as in Samples 1028 and 1029, the temperature coefficient (τf) of the resonance frequency is shifted to the minus side from −50 ppm/° C. The reason for excluding the range on the line A'B' is that with y=0, the composition cannot be sufficiently sintered at a firing temperature of 1350 to 1450° C., and thus, firing at a high temperature of over 1500° C. is required, thereby causing many disadvantages for industrial mass production.

The reason for excluding the line C'D' is as follows. With x constant, the temperature coefficient (τf) of the resonance frequency is shifted to the minus side as z decreases. For example, this property is exhibited in Samples 1004 to 1006, 1016, 1022 and 1023 shown in Table 3. Therefore, in order to obtain the same temperature coefficient (τf) of the resonance frequency, it is necessary that x is increased as z is decreased. However, the Q value is decreased by increasing x, and thus x is as low as possible for obtaining a high Q value. For example, comparison between Samples 1008 and 1016 shown in Table 3, which show substantially the same temperature coefficient of the resonance frequency, indicates that in Sample 1016 having high z, a higher Q value is obtained. For this reason, the range on the line C'D' is excluded because the effect of decreasing x, i.e., the effect of improving the Q value, cannot be expected.

Comparison of Sample 1016 shown in Table 3 with Samples 1041 to 1052 shown in Table 4, and comparison of Sample 1005 shown in Table 3 with Samples 1053 to 1056 shown in Table 4 indicate that it is most preferable to use La as the rare earth element. The use of La can obtain both high dielectric constant ($\epsilon_r$) and high Q value. Comparison between Samples 1041, 1044, 1047 and 1050 indicates that the use of Nd or Sm as a rare earth element can obtain a higher Q value, as compared with the use of Y or Pr.

In the high-frequency dielectric ceramic composition of the present invention, small amounts of additives may be added in ranges having no adverse effect on the object of the present invention. For example, addition of about 0.01 to 0.1% by weight of $SiO_2$, $MnCO_3$, $B_2O_3$, ZnO, NiO, CuO, $Li_2CO_3$ or the like, decreases the firing temperature by 20 to 30° C., while suppressing deterioration in characteristics. Also addition of about 1 to 3% by weight of $ZrO_2$, $SnO_2$, $Nb_2O_5$, $WO_3$ or the like permits fine control of the dielectric constant ($\epsilon_r$) and temperature characteristic, thereby obtaining excellent dielectric ceramic.

As described above, the present invention can provide a high-frequency dielectric ceramic composition having a high dielectric constant ($\epsilon_r$) of as high as 37 to 51, and a Q value of as high as 20,000 (at 1 GHz) or more, and permitting fine control of the temperature coefficient (τf) of the resonance frequency to any desired values with 0 (ppm/° C.) as a center.

Therefore, dielectric ceramic having the above-described composition can be used for manufacturing a dielectric resonator, dielectric filter, dielectric duplexer, and communication devices, each having good characteristics.

Another high-frequency dielectric ceramic composition comprises a rare earth element (Ln and Lm), Mg, Ta, Sb, Ti and M (M: at least one of Ca and Sr), and has a composition represented by the composition formula, $xMTi_aO_{1+2a}-yLn(Mg_{2/3}Ta_{1/3})_bO_{(3+3b)/2}-zLm(Mg_{2/3}Sb_{1/3})_cO_{(3+3c)/2}$ (wherein x, y and z are by mol %), wherein a, b, c, x, y and z are respectively in the following ranges.

The parameter a is in the range of $0.950 \leq a \leq 1.050$. This is because with a <0.950, or a>1.050, the Q value is decreased, failing to achieve the object of the present invention.

The parameter b is in the range of $0.900 \leq a \leq 1.050$. This is because with b <0.900, or b>1.050, the Q value is decreased.

The parameter c is in the range of $0.900 \leq c \leq 1.050$. This is because with c<0.900, or c>1.050, the Q value is decreased.

The parameters x, y and z are on a polygonal line or inside the line (except on line C"D"), which connects points A", B", C" and D" in the ternary composition diagram of FIG. 4. With x, y and z outside the line A"D", the temperature coefficient (τf) of the resonance frequency exceeds +50 ppm/° C., while with x, y, and z outside the line B"C", the temperature coefficient (τf) of the resonance frequency is shifted to the minus side from −50 ppm/° C. The reason for excluding the line C"D" is that with z=0, the composition cannot be sufficiently sintered at a firing temperature of 1,350 to 1,400° C., and thus, firing at a high temperature of over 1,400° C. is required, thereby causing many disadvantages for industrial mass production.

In the high-frequency dielectric ceramic composition of the present invention, as the rare earth element (Ln and Lm), Y, La, Pr, Nd, Sm or the like is preferably used. However, of these elements, La, Nd or Sm is more preferably used, and La is most preferably used. The use of Nd or Sm improves the Q value, and the use of La can further increase the dielectric constant ($\epsilon_r$) and the Q value.

The present invention will be in further detail below.

As starting raw materials, high-purity calcium carbonate ($CaCO_3$), strontium carbonate ($SrCO_3$), titanium oxide ($TiO_2$), rare earth oxides ($La_2O_3$, and the like), magnesium oxide (MgO), tantalum oxide ($Ta_2O_3$) and antimony oxide ($Sb_2O_3$) were prepared.

These raw materials were mixed to obtain compositions represented by the composition formula, $xMTi_aO_{1+2a}-yLa(Mg_{2/3}Ta_{1/3})_bO_{(3+3b)/2}-zLa(Mg_{2/3}Sb_{1/3})_cO_{(3+3c)/2}$ (wherein x, y and z are by mol %) shown in Table 5. These raw materials were also mixed to obtain compositions represented by the composition formula, $xMTi_aO_{1+2a}-yLn(Mg_{2/3}Ta_{1/3})_bO_{(3+3b)/2}-zLm(Mg_{2/3}Sb_{1/3})_cO_{(3+3c)/2}$ (wherein x, y and z are by mol %) shown in Table 6.

TABLE 5

| Sample No. | M | $xMTi_aO_{1+2a} - yLa(Mg_{2/3}Ta_{1/3})_bO_{(3+3b)/2} - zLa(Mg_{½}Ti_{½})_cO_{(3+3c)/2}$ System | | | | | | Dielectric Constant $\epsilon_r$ | Q Value 1 GHz | Temperature Coefficient of Resonance Frequency τf(ppm/° C.) |
|---|---|---|---|---|---|---|---|---|---|---|
| | | a | b | c | x | y | z | | | |
| *2001 | Ca | 1.000 | 1.000 | 1.000 | 80.0 | 5.0 | 15.0 | 58.2 | 22500 | +65 |
| *2002 | Ca | 1.000 | 1.000 | 1.000 | 80.0 | 15.0 | 5.0 | 58.9 | 21300 | +68 |
| 2003 | Ca | 1.000 | 1.000 | 1.000 | 75.0 | 0.0 | 25.0 | 53.6 | 27600 | +45 |
| 2004 | Ca | 1.000 | 1.000 | 1.000 | 75.0 | 15.0 | 10.0 | 53.8 | 25300 | +45 |
| *2005 | Ca | 1.000 | 1.000 | 1.000 | 75.0 | 25.0 | 0.0 | | Green | |
| 2006 | Ca | 1.000 | 1.000 | 1.000 | 70.0 | 10.0 | 20.0 | 49.1 | 35800 | +20 |
| 2007 | Ca | 1.000 | 1.000 | 1.000 | 70.0 | 20.0 | 10.0 | 49.4 | 35400 | +20 |
| 2008 | Ca | 1.000 | 1.000 | 1.000 | 67.5 | 12.5 | 20.0 | 46.8 | 37400 | +4 |
| 2009 | Ca | 1.000 | 1.000 | 1.000 | 67.5 | 20.0 | 12.5 | 47.0 | 37000 | +4 |
| 2010 | Ca | 1.000 | 1.000 | 1.000 | 65.0 | 0.0 | 35.0 | 43.1 | 37400 | −9 |
| *2011 | Ca | 0.900 | 1.000 | 1.000 | 65.0 | 17.5 | 17.5 | 43.7 | 17500 | −9 |
| 2012 | Ca | 0.950 | 1.000 | 1.000 | 65.0 | 17.5 | 17.5 | 43.9 | 36000 | −8 |
| *2013 | Ca | 1.000 | 0.850 | 1.000 | 65.0 | 17.5 | 17.5 | 43.9 | 19300 | −8 |

TABLE 5-continued

| | | $xMTi_aO_{1+2a}$ − $yLa(Mg_{2/3}Ta_{1/3})_bO_{(3+3b)/2}$ − $zLa(Mg_{1/2}Ti_{1/2})_cO_{(3+3c)/2}$ System | | | | | | Dielectric Constant | Q Value | Temperature Coefficient of Resonance Frequency |
|---|---|---|---|---|---|---|---|---|---|---|
| Sample No. | M | a | b | c | x | y | z | $\epsilon_r$ | 1 GHz | $\tau f$(ppm/° C.) |
| 2014 | Ca | 1.000 | 0.900 | 0.900 | 65.0 | 17.5 | 17.5 | 44.0 | 36500 | −8 |
| *2015 | Ca | 1.000 | 1.000 | 0.850 | 65.0 | 17.5 | 17.5 | 43.9 | 18800 | −7 |
| 2016 | Ca | 1.000 | 1.000 | 1.000 | 65.0 | 17.5 | 17.5 | 43.9 | 36300 | −8 |
| *2017 | Ca | 1.000 | 1.000 | 1.100 | 65.0 | 17.5 | 17.5 | 43.8 | 16100 | −8 |
| 2018 | Ca | 1.000 | 1.050 | 1.050 | 65.0 | 17.5 | 17.5 | 44.0 | 36200 | −7 |
| *2019 | Ca | 1.000 | 1.100 | 1.000 | 65.0 | 17.5 | 17.5 | 43.9 | 15600 | −8 |
| 2020 | Ca | 1.050 | 1.000 | 1.000 | 65.0 | 17.5 | 17.5 | 43.9 | 32400 | −8 |
| *2021 | Ca | 1.100 | 1.000 | 1.000 | 65.0 | 17.5 | 17.5 | 43.8 | 12900 | −7 |
| *2022 | Ca | 1.000 | 1.000 | 1.000 | 65.0 | 35.0 | 0.0 | | | Green |
| 2023 | Ca | 1.000 | 1.000 | 1.000 | 60.0 | 15.0 | 25.0 | 40.4 | 38000 | +28 |
| 2024 | Ca | 1.000 | 1.000 | 1.000 | 60.0 | 25.0 | 15.0 | 40.6 | 37900 | +28 |
| 2025 | Ca | 1.000 | 1.000 | 1.000 | 55.0 | 0.0 | 45.0 | 36.7 | 43400 | −42 |
| 2026 | Ca | 1.000 | 1.000 | 1.000 | 55.0 | 22.5 | 22.5 | 37.2 | 41200 | −40 |
| *2027 | Ca | 1.000 | 1.000 | 1.000 | 55.0 | 45.0 | 0.0 | | | Green |
| *2028 | Ca | 1.000 | 1.000 | 1.000 | 50.0 | 15.0 | 35.0 | 34.2 | 46100 | +58 |
| *2029 | Ca | 1.000 | 1.000 | 1.000 | 50.0 | 35.0 | 15.0 | 34.8 | 45700 | +56 |
| *2030 | 0.8Ca0.2Sr | 0.900 | 1.000 | 1.000 | 65.0 | 25.0 | 10.0 | 43.5 | 12400 | −3 |
| 2031 | 0.8Ca0.2Sr | 0.950 | 1.000 | 1.000 | 65.0 | 25.0 | 10.0 | 43.5 | 29700 | −4 |
| *2032 | 0.8Ca0.2Sr | 1.000 | 0.850 | 1.000 | 65.0 | 25.0 | 10.0 | 43.6 | 15200 | −3 |
| 2033 | 0.8Ca0.2Sr | 1.000 | 0.900 | 0.900 | 65.0 | 25.0 | 10.0 | 43.5 | 32000 | −4 |
| *2034 | 0.8Ca0.2Sr | 1.000 | 1.000 | 0.850 | 65.0 | 25.0 | 10.0 | 43.6 | 14500 | −4 |
| 2035 | 0.8Ca0.2Sr | 1.000 | 1.000 | 1.000 | 65.0 | 25.0 | 10.0 | 43.6 | 31800 | −4 |
| *2036 | 0.8Ca0.2Sr | 1.000 | 1.000 | 1.100 | 65.0 | 25.0 | 10.0 | 43.5 | 16200 | −3 |
| 2037 | 0.8Ca0.2Sr | 1.000 | 1.050 | 1.050 | 65.0 | 25.0 | 10.0 | 43.5 | 31100 | −3 |
| *2038 | 0.8Ca0.2Sr | 1.000 | 1.100 | 1.000 | 65.0 | 25.0 | 10.0 | 43.6 | 17800 | −4 |
| 2039 | 0.8Ca0.2Sr | 1.050 | 1.000 | 1.000 | 65.0 | 25.0 | 10.0 | 43.6 | 28000 | −4 |
| *2040 | 0.8Ca0.2Sr | 1.100 | 1.000 | 1.000 | 65.0 | 25.0 | 10.0 | 43.5 | 11200 | −3 |

TABLE 6

$xMTi_aO_{1+2a}$−$yLa(Mg_{2/3}Ta_{1/3})_bO_{(3+3b)/2}$−$zLa(Mg_{1/2}Ti_{1/2})_cO_{(3+3c)/2}$ System

| Sample No. | Rare Earth Element (Ln, Lm) | Dielectric Constant $\epsilon_r$ | Q Value 1 GHz | Temperature Coefficient of Resonance Frequency $\tau f$(ppm/° C.) | Remarks |
|---|---|---|---|---|---|
| 2041 | Y | 42.8 | 36200 | −8 | Corresponding to Sample 2016 shown in Table 5 |
| 2042 | 0.1 Y · 0.9 La | 43.6 | 36500 | −8 | |
| 2043 | 0.3 Y · 0.7 La | 43.1 | 36500 | −8 | |
| 2044 | Pr | 43.0 | 36800 | −8 | |
| 2045 | 0.1 Pr · 0.9 La | 43.7 | 36500 | −7 | |
| 2046 | 0.3 Pr · 0.7 La | 43.4 | 36900 | −7 | |
| 2047 | Nd | 42.6 | 37200 | −9 | |
| 2048 | 0.1 Nd · 0.9 La | 43.6 | 37000 | −8 | |
| 2049 | 0.3 Nd · 0.7 La | 43.3 | 37100 | −8 | |
| 2050 | Sm | 41.2 | 37500 | −4 | |
| 2051 | 0.1 Sm · 0.9 La | 43.4 | 36900 | −6 | |
| 2052 | 0.3 Sm · 0.7 La | 42.9 | 36800 | −7 | |
| 2053 | 0.5 Y · 0.5 La | 43.1 | 31000 | −5 | Corresponding to Sample 2035 shown in Table 5 |
| 2054 | 0.5 Pr · 0.5 La | 43.2 | 31200 | −4 | |
| 2055 | 0.5 Nd · 0.5 La | 43.1 | 31500 | −4 | |
| 2056 | 0.5 Sm · 0.5 La | 42.8 | 31800 | −3 | |

Samples 2041 to 2056 shown in Table 6 respectively contain the various rare earth elements shown in the column "Rare Earth Element" in Table 6 in place of La in the composition formula shown in Table 5, Samples 2041 to 2052 respectively have compositions corresponding to Sample 2016 shown in Table 5, and Samples 2053 to 2056 respectively have compositions corresponding to Sample 2035 shown in Table 5.

A powder of these mixed raw materials was wet-milled for 16 hours by using a ball mill, dehydrated, dried and then calcined at 1100 to 1300° C. for 3 hours. An appropriate amount of binder was added to the resultant calcined powder and the mixture was again wet-ground for 16 hours by using the ball mill to obtain a powder.

The thus-obtained powder was molded to a disk shape by using a press under a pressure of 1,000 to 2,000 kg/cm², and then fired in the atmosphere at 1350 to 1400° C. for 4 hours to obtain ceramic having a diameter of 10 mm and a thickness of 5 mm and composed of a perovskite crystal phase as a main crystal.

The thus-obtained ceramic was measured with respect to the dielectric constant ($\epsilon_r$) at a measurement frequency of 6 to 8 GHz, and the Q value by the double-end short-circuit type dielectric resonator method, and the measurements were converted to a Q value at 1 GHz according to Q×f= constant. Also the temperature coefficient ($\tau f$) of the resonance frequency between 25 and 55° C. was measured from the TE[01δ] mode resonance frequency. The results are shown in Tables 5 and 6. In Table 5, Sample Nos. marked with an asterisk * are beyond the range of the present invention.

Tables 5 and 6 indicate that the samples in the range of the present invention can exhibit high Q values while maintaining dielectric constants at high values in the microwave band.

The reasons for limiting the composition represented by the composition formula of the present invention, $xMTi_aO_{1+2a}$-$yLn(Mg_{2/3}Ta_{1/3})_bO_{(3+3b)/2}$-$zLm(Mg_{2/3}Sb_{1/3})_cO_{(3+3c)/2}$ (wherein Ln and Lm are elements, and M is at least one of Ca and Sr) will be described mainly with reference to Table 5.

First, the reason for limiting a in the range of $0.950 \leq a \leq 1.050$ is that with a<0.950, as in Samples 2011 and 2030, and with a>1.050, as in Samples 2021 and 2040, the Q value is decreased, failing to achieve the object of the present invention.

The reason for limiting b in the range of $0.900 \leq a \leq 1.050$ is that with b<0.900, as in Samples 2013 and 2032, and with 1.050<b, as in Samples 2019 and 2038, the Q value is decreased.

The reason for limiting c in the range of $0.900 \leq a \leq 1.050$ is that with $c<0.900$, as in Samples 2015 and 2034, and with $1.050<c$, as in Samples 2017 and 2036, the Q value is decreased.

The reasons for liming x, y and z in the region on the polygonal line or inside the line (except on the line C"D") which connects points A", B", C" and D" in a ternary composition diagram of FIG. 4 are as follows:

In the region outside the line A"D", as in Samples 2001 and 2002, the temperature coefficient ($\tau f$) of the resonance frequency exceeds +50 ppm/° C., while in the region outside the line B"C", as in Samples 2028 and 2029, the temperature coefficient ($\tau f$) of the resonance frequency is shifted to the minus side from −50 ppm/° C. The reason for excluding the line C"D"is that with z=0, the composition cannot be sufficiently sintered at a firing temperature of 1350 to 1400° C., and thus, firing at a high temperature of over 1400° C. is required, thereby causing many disadvantages for industrial mass production.

Comparison of Sample 2016 shown in Table 5 with Samples 2041 to 2052 shown in Table 6, and comparison of Sample 2035 shown in Table 5 with Samples 2053 to 2056 shown in Table 6 indicate that it is most preferable to use La as the rare earth element. The use of La can obtain both high dielectric constant ($\in_r$) and high Q value. Comparison between Samples 2041, 2044, 2047 and 2050 indicates that the use of Nd or Sm as a rare earth element can obtain a higher Q value, as compared with the use of Y or Pr.

In the high-frequency dielectric ceramic composition of the present invention, small amounts of additives may be added in ranges having no adverse effect on the object of the present invention. For example, addition of about 0.01 to 0.1% by weight of $SiO_2$, $MnCO_3$, $B_2O_3$, ZnO, NiO, CuO, $Li_2CO_3$ or the like decreases the firing temperature by 10 to 20° C., while suppressing deterioration in characteristics. Also addition of about 1 to 3% by weight of $Nb_2O_5$, $V_2O_5$, $WO_3$ or the like permits fine control of the dielectric constant ($\in_r$) and temperature characteristic, thereby obtaining excellent dielectric ceramic.

As described above, the present invention can provide a high-frequency dielectric ceramic composition having a high dielectric constant ($\in_r$) of as high as 37 to 54, and a Q value of as high as 20000 (at 1 GHz) or more, and permitting fine control of the temperature coefficient ($\tau f$) of the resonance frequency to any desired values with 0 (ppm/° C.) as a center.

Therefore, dielectric ceramic having the above-described composition can be used for manufacturing a dielectric resonator, a dielectric filter, a dielectric duplexer, and a communication device, each having good characteristics.

What is claimed is:

1. A high-frequency dielectric ceramic composition comprising a rare earth element (Ln), Mg, Ta, Ti and M, wherein M is at least one of Ca and Sr, having a composition represented by the composition formula $aLnO_{x/2}$-bMgO-$cTaO_{5/2}$-dMO-$eTiO_2$;

wherein a, b, c, d, e and x are mol % in the following ranges:
   $0.100 \leq a \leq 0.350$;
   $0.067 \leq b \leq 0.233$;
   $0.033 \leq c \leq 0.117$;
   $0.150 \leq d \leq 0.400$;
   $0.150 \leq e \leq 0.400$;
   a+b+c+d+e=1; and
   wherein $3 \leq x \leq 4$.

2. A high-frequency dielectric ceramic composition according to claim 1, wherein $0.150 \leq a \leq 0.200$;
$0.100 \leq b \leq 0.133$;
$0.050 \leq c \leq 0.067$;
$0.300 \leq d \leq 0.350$; and
$0.300 \leq e \leq 0.350$.

3. A high-frequency dielectric ceramic composition according to claim 1 wherein the rare earth element (Ln) is at least one member selected from the group consisting of Y, La, Ce, Pr, Nd, Sm, Dy and Er.

4. A high-frequency dielectric ceramic composition according to claim 1, wherein the rare earth element is La.

5. A high-frequency dielectric ceramic composition according to claim 1, wherein M is Ca.

6. A high-frequency dielectric ceramic composition according to claim 5 wherein the rare earth element (Ln) is at least one member selected from the group consisting of Y, La, Ce, Pr, Nd and Sm.

7. A high-frequency dielectric ceramic composition according to claim 1, wherein the rare earth element is La and M is Ca.

8. A high-frequency dielectric ceramic composition according to claim 1 represented by the composition formula $yLn(Mg_{2/3}Ta_{1/3})O_3$-(1-y)$MTiO_3$ wherein $0.2 \leq y \leq 0.7$.

9. A high-frequency dielectric ceramic composition according to claim 1 having a composition represented by the composition formula, wherein Lm is a rare earth $xMTi_{a'}O_{1+2a'}$-$yLn(Mg_{2/3}Ta_{1/3})_{b'}O_{(3+3b')/2}$-$zLm(Mg_{2/3}Sb_{1/3})_{c'}O_{(3+3c')/2}$, wherein a', b', c', x, y and z are mol %,
$0.950 \leq a' \leq 1.050$;
$0.900 \leq b' \leq 1.050$; and
$0.900 \leq c' \leq 1.050$;

x, y and z are on the lines, except for line C"D", or within the polygonal area defined by the lines which connects the following points in a ternary composition diagram
point A" (x=75, y=0, z=25);
point B" (x=55, y=0, z=45);
point C" (x=55, y=45, z=0); and
point D" (x=75, y=25 z,=0).

10. A high-frequency dielectric ceramic composition according to claim 9, wherein each rare earth element (Ln and Lm) is at least one member individually selected from the group consisting of Y, La, Pr, Nd, and Sm.

11. A high-frequency dielectric ceramic composition according to claim 9, wherein each rare earth element (Ln and Lm) is at least one member individually selected from the group consisting of La, Nd and Sm.

12. A high-frequency dielectric ceramic composition according to claim 9, wherein each rare earth element (Ln, Lm) is La.

13. A high-frequency dielectric ceramic composition according to claim 1 having a composition represented by the composition formula, wherein Lm is a rare earth $xMTi_{a'}O_{1+2a'}$-$yLn(Mg_{2/3}Ta_{1/3})_{b'}O_{(3+3b')/2}$-$zLm(Mg_{1/2}Ti_{1/2})_{c'}O_{(3+3c')/2}$, wherein a', b', c', x, y and z are mol %;
$0.950 \leq a' \leq 1.050$;
$0.900 \leq b' \leq 1.050$; and
$0.900 \leq c' \leq 1.050$;

x, y and z are on the lines, except on lines A'B' and C'D', or within the polygonal area within the lines which connects the following points in a ternary composition diagram point A' (x=70, y=0, z=30);
point B' (x=50, y=0, z=50);
point C' (x=50, y=50, z=0); and
point D' (x=70, y=30 z=0).

14. A high-frequency dielectric ceramic composition according to claim 13, wherein each rare earth element (Ln and Lm) is at least one member individually selected from the group consisting of Y, La, Pr, Nd, and Sm.

15. A high-frequency dielectric ceramic composition according to claim 14, wherein M is Ca.

16. A high-frequency dielectric ceramic composition according to claim 15, wherein each rare earth element (Ln and Lm) is at least one member individually selected from the group consisting of La, Nd and Sm.

17. A high-frequency dielectric ceramic composition according to claim 15, wherein each rare earth element (Ln and Lm) is La.

18. An electromagnetic field coupling dielectric resonator comprising the combination of a dielectric ceramic, an input terminal and an output terminal, wherein the dielectric ceramic comprises a high-frequency dielectric ceramic composition according to claim 1.

19. A dielectric filter comprising a dielectric resonator according to claim 18 in combination with an external coupler.

20. A dielectric duplexer comprising:
a first and second dielectric filter;
an input connector and an output connector connected to the first dielectric filter;
an input connector and an output connector connected to the second dielectric filter; and
an antenna connector connected to output connector of the first dielectric filter and the input connector of the second dielectric filter;
wherein at least one of the dielectric filters is a dielectric filter according to claim 19.

21. A communication device comprising:
a dielectric duplexer according to claim 20;
a transmitting circuit connected to at least one of said input or output connectors of the dielectric duplexer;
a receiving circuit connected to at least one of said input or output connectors different from the input or output connector connected to the transmitting circuit; and
an antenna connected to antenna connector of the dielectric duplexer.

* * * * *